United States Patent
Shepherd

Patent Number: 6,101,064
Date of Patent: *Aug. 8, 2000

[54] METHODS AND APPARATUS FOR EFFICIENTLY CONTROLLING A READ/WRITE HEAD IN A COMPUTER DISK DRIVE

[75] Inventor: Stanley H. Shepherd, Morgan Hill, Calif.

[73] Assignee: Quantum Corporation, Milpitas, Calif.

[*] Notice: This patent is subject to a terminal disclaimer.

[21] Appl. No.: 09/021,513

[22] Filed: Feb. 10, 1998

Related U.S. Application Data

[63] Continuation-in-part of application No. 08/907,581, Aug. 8, 1997, abandoned.

[51] Int. Cl.⁷ .................................................. G11B 5/596
[52] U.S. Cl. ...................................... 360/77.08; 360/78.14
[58] Field of Search ........................... 360/77.02, 77.04, 360/77.08, 78.14

[56] References Cited

U.S. PATENT DOCUMENTS

| | | | |
|---|---|---|---|
| 3,881,184 | 4/1975 | Koepcke et al. | 360/78 |
| 4,424,543 | 1/1984 | Lewis et al. | 360/135 |
| 4,616,276 | 10/1986 | Workman | 360/77 |
| 5,072,318 | 12/1991 | Yu | 360/77.02 |
| 5,237,574 | 8/1993 | Weng | 371/40.1 |
| 5,420,730 | 5/1995 | Moon et al. | 360/77.08 |
| 5,444,583 | 8/1995 | Ehrlich et al. | 360/78.09 |
| 5,448,429 | 9/1995 | Cribbs | 360/75 |
| 5,600,506 | 2/1997 | Baum et al. | 360/77.08 X |
| 5,602,693 | 2/1997 | Brunnett et al. | 360/77.08 |
| 5,760,990 | 6/1998 | Ukani et al. | 360/77.08 X |
| 5,781,361 | 7/1998 | Le et al. | 360/77.08 |
| 5,825,579 | 10/1998 | Cheung et al. | 360/77.02 |
| 5,825,580 | 10/1998 | Shibata | 360/77.08 |
| 5,867,341 | 2/1999 | Volz et al. | 360/77.08 |

*Primary Examiner*—Andrew L. Sniezek
*Attorney, Agent, or Firm*—Beyer & Weaver

[57] ABSTRACT

Methods and apparatus for ascertaining a position of a read/write head relative to a reference position on a rotatable disk in a computer disk drive are disclosed. In one aspect of the present invention, a method for determining the position of a read/write head relative to a reference position on a rotatable disk in a computer disk drive includes reading amplitudes of a set of servo bursts embedded in tracks of the disk and classifying the servo bursts into a converging servo burst set and a detection servo burst set around the reference position. The method also includes forming a position error signal by augmenting a detection servo burst signal with a converging servo burst signal as well as a normalization factor. The converging servo burst signal is formed from amplitudes of the converging servo burst set at the position of the read/write head. The detection servo burst signal is formed from amplitudes of the detection servo burst set at the position of the read/write head. The position error signal represents an offset from the reference position.

22 Claims, 5 Drawing Sheets

METHODS AND APPARATUS FOR EFFICIENTLY CONTROLLING A READ/WRITE HEAD IN A COMPUTER DISK DRIVE

CROSS REFERENCE TO RELATED APPLICATION

This application is a continuation-in-part of U.S. patent application Ser. No. 08/907,581, filed Aug. 8, 1997 now abandoned, which is incorporated by reference herein in its entirety.

BACKGROUND OF THE INVENTION

The present invention relates to disk drive servo control. More particularly, the present invention relates to improved methods and apparatus for positioning a read/write (R/W) head of a disk drive based on servo burst amplitudes.

Hard disk drives have long been employed for storing data in computer systems. In disk drive servo control, some technique is typically employed to servo the read/write (R/W) head to a particular position on the disk to either write data to a specified region on the disk or to read data from the specified region. Accurate positioning of the head to read or write the data is a challenging task, given the possibility of shock, vibration, temperature and/or manufacturing related variations. To counter the effects of these variables and to ensure accurate positioning of the head, some hard drives employ embedded servo marks and servo bursts for positioning the head in a desired region of the disk for reading or writing.

To facilitate discussion, FIG. 1 depicts a simplified diagram of a hard disk drive 100, typical of hard disk drives known in the art, including a hard disk surface 102. A read/write (R/W) head 104 couples to a suspension arm 106, which is urged by a motor 108 to move R/W head 104 between inner diameter (ID) 110 and outer diameter (OD) 112 of disk surface 102. Motor 108 is shown coupled to a servo circuit 114, which furnishes servo control information to motor 108 to enable motor 108 to position RIW head 104 at a desired location on disk surface 102. Although only one disk surface 102 and one suspension arm 106 are shown for simplicity, it should be understood that there may exist multiple disks, each of which may have both surfaces available for data storage, as well as multiple suspension arms in a typical hard disk drive.

The area between inner diameter (ID) 110 and outer diameter (OD) 112 of disk surface 102 is typically divided into tracks in the form of concentric rings, e.g., tracks 116, 117, 118, and 119. These tracks, which enable data to be located radially, typically go all the way around the disk surface although only a portion of each track is shown in FIG. 1 to simplify the illustration.

Disk surface 102 may also be divided into wedges, or sectors, to enable the data to be located circumferentially about the disk. One such data-storing sector is illustrated in FIG. 1 as sector 126. In between adjacent data-storing sectors, there may be provided a servo wedge, e.g., servo wedge 128 in FIG. 1, for storing positioning data to assist servo circuit 114 in ascertaining the current position of the head. Such positioning data may include, for example, the track number and the sector number. By reading the positioning data, servo circuit 114 may ascertain where on disk surface 102 R/W head 104 is currently positioned.

The above-described technique of positioning the R/W head may permit the head to be placed at the desired sector/track. For some drives, this degree of positioning accuracy is all that is needed. For other drives, however, a greater degree of accuracy is needed. By way of example, in some modem hard drives in which the tracks are reduced in width and packed closely together to increase density, it may be necessary not only to position the head at a particular track but also at a specified position within a track, e.g., at the track center, to minimize noise when reading or writing data. In such drives, embedded servo bursts may be employed to facilitate the required center-track positioning.

FIG. 2 depicts an enlarged view of servo wedge 128 at tracks 116, 117, 118, and 119 of FIG. 1. For simplicity of illustration, the data pertaining to the sectors and tracks have been omitted. Along the tracks within the servo wedge, there are shown a plurality of servo bursts, A, B, C, and D, which are typically written onto surface 102 of the disk during manufacturing. The servo bursts are offset in the track-width direction by, for example, a half track each. Servo bursts A, B, C, and D are in a quadrature arrangement and form a contiguous set, which repeats every other track as shown in FIG. 2. By reading the servo bursts as the R/W head is servoed from track to track, it is possible to ascertain the current position of the R/W head from the servo burst amplitudes.

To further illustrate the foregoing, FIG. 3 plots the amplitudes of the servo burst signals as the R/W head moves across the tracks. For example, consider the situation wherein the head is positioned at track center 204 (of track 116) and moves downward in FIG. 2. The amplitudes of servo bursts A0, B0, C0, and D0 are as follows. At track center line 204, the amplitude of the signal obtained from servo burst B0 will be at its maximum (since the head is located at the center of servo burst B0). However, as the head is moved away from this center of servo burst B0, the amplitude of the signal associated with servo burst B0 decreases from the maximum value. This is shown in FIG. 3 as the amplitude of servo burst B0 decreases as the R/W head moves from line 204 toward line 206 (which delineates the boundary of track 117).

At track center 204, the amplitude of the servo burst D0 will be low since the head is positioned away from servo burst D0. This is shown in FIG. 3 around the vicinity of line 204 (i.e., the track center of track 116 as shown in FIG. 2). However, as the R/W head moves downward in FIG. 2, it moves closer to servo burst D0. Accordingly, the amplitude of servo burst D0 increases as the R/W head moves from line 204 toward line 206 in FIG. 3 (which delineates the boundary of track 117).

At track center 204, the amplitude of the servo burst A0 will be decreasing since the head is moving away from servo burst A0. This is shown in FIG. 3 around the vicinity of line 204 (i.e., the track center of track 116 as shown in FIG. 2). As the R/W head moves downward in FIG. 2, it moves further away from servo burst A0. Accordingly, the amplitude of servo burst A0 decreases as the R/W head moves from line 204 toward line 206 in FIG. 3 (which delineates the boundary of track 117). The amplitude of servo burst A0 reaches its minimum at the vicinity of line 206 and increases again as it approaches servo burst A1 (shown in FIG. 2).

At track center 204, the amplitude of the servo burst C0 will be increasing since the head is moving toward the center of servo burst C0. This is shown in FIG. 3 around the vicinity of line 204 (i.e., the track center of track 116 as shown in FIG. 2). As the R/W moves downward in FIG. 2, it moves closer to the center of servo burst C0. Accordingly, the amplitude of servo burst C0 increases as the R/W head moves from line 204 toward line 206 in FIG. 3 (which delineates the boundary of track 117). The amplitude of servo burst C0 reaches its maximum at the vicinity of line 206 and decreases again as it continues to move away from the center of servo burst C0 (shown in FIG. 2).

To servo to the track center of track 116 (line 204 in FIG. 2), for example, the servo circuit may first servo the R/W to track 116 (by, for example, reading the aforementioned sector and track data in the servo wedge and moving the head accordingly). It then reads the amplitudes of the servo bursts to ascertain the current position of the head. The relationship between individual servo burst measurements allows the servo circuit to calculate the radial distance by which the head needs to move in order to position the head at the center track position. By way of example, the servo circuit may move the head to the point where it calculates the amplitudes of servo bursts A0 and C0 would be equal to each other. With reference to FIG. 2, if the calculation is correct, this position would correspond to line 204, i.e., the center of track 116.

It has been recognized that individual servo burst measurements may at times be susceptible to variations in the environment, e.g., the temperature, the sensitivity of the head, the manufacturing tolerance, the distance from head to disk, and/or other factors. It is also known that the use of signals representative of the difference between amplitudes of complementary servo burst pairs substantially reduces the influence of the environmental factors, thereby reducing the need for calibration and improving positioning accuracy.

FIG. 4 plots the difference between amplitudes of complementary servo burst pairs as the R/W head moves across the tracks. With reference to FIGS. 2 and 3, the complementary servo burst pairs are A/C and B/D. When the head is positioned at line 202 (which delineates the start of track 116), the amplitude of servo burst A will be at maximum and the amplitude of servo burst C will be at minimum. According, the value of signal A–C will be at its maximum, as shown in FIG. 4.

Further, the value of signal A–C will be at zero around the vicinity of line 204. With reference to FIG. 2, it can be seen that the amplitudes associated with servo bursts A and C are substantially equal at this center track line 204. By servoing the head to the position where the value of signal A–C equals zero, the servo circuit is thus able to position the head at the track center. The use of the differential signal reduces the need for calibration since it is recognized that environmental factors tend to affect the measurements of both servo bursts A and C. By subtracting their values from one another, the effect of the environmental factors may be balanced out and/or substantially reduced.

As the drive becomes smaller and/or the storage capacity increases, the adjacent tracks become increasingly narrower and more tightly packed together. At the same time, the dimension of the head shrinks to accommodate the smaller tracks. It has been found with the smaller form factor drives that it is sometimes necessary to servo the head not only to the half track position but also to the quarter track position. With reference to FIG. 2, the quarter track positions within track 116 are depicted by lines 203 and 205, which are ¼ track away from track boundaries 202 and 206 respectively. The ability to accurately servo the head to the quarter track position is particularly useful in drives which employ magneto-resistive (MR) heads since the read and write heads are separately located (typically fore and aft relative to the suspension arm) and may therefore be offset from one another relative to the track.

It has been found, however, that prior art techniques of calculating track position based on servo burst amplitudes are subject to discontinuity at the point where the calculation switches from one set of servo bursts to the next. To explain the foregoing, consider the manner in which the prior art calculates the Position Error Signal (PES) from the servo burst amplitudes. As the term is employed herein, the Position Error Signal (PES) refers to the offset of the head from either a track edge or a track center. With reference to FIG. 2, for example, the PES refers to the offset of the head from either line 202, 204, or 206 of track 116. The combination of a PES value and the reference line (e.g., either line 202, 204, or 206) permits the servo circuit to ascertain the current position of the head and thus the calculated distance by which the head must move in order to be positioned at the quarter track position.

To further explain the foregoing, consider the situation wherein the head is between track boundary 202 and quarter track line 203, and the values of B–D is currently 0.5 volt (as read from servo bursts B and D). The measured value of B–D of 0.5 volt is shown in FIG. 4 at point 402. With reference to FIG. 3, it is shown that the amplitude of the B servo burst is rising in this region between lines 202 and 204 while the amplitude of servo burst D is falling in this region. In the prior art, the head position is calculated by the following expression, referred to herein as "Equation 1," or "Eq. 1":

$$0.5n + \frac{R-F}{4K}$$

wherein n represents an integer. The expression 0.5*n represents the reference line from which the head is offset. As mentioned earlier, this reference line may be either a track boundary or a track center line (as indicated by the value 0.5 in the expression 0.5*n). With reference to FIG. 2, the reference line may be, for example, either line 202, 204, 206, or 208 depending on the value of n.

The expression ((R–F)/(4*K)) represents the PES, i.e., the offset from the reference line, wherein R represents the amplitude of the rising servo burst and F represents the amplitude of the falling servo burst. In the present example in which the head is located between lines 202 and 203, R represents the amplitude of the rising B servo burst while F represents the amplitude of the falling D servo burst.

The value K in Eq. 1 represents the quarter track normalization value which translates the measured value of R–F (measured in volts) into an offset value within a quarter track. By way of example, if the value K is 0.7 volts (as shown in FIG. 4), the ratio (R–F)/K would yield the amount of offset within a quarter track. For example, if the measured value of R–F (e.g., the amplitude of the rising B servo burst minus the amplitude of the falling D servo burst) is 0.5 volts, the ratio of 0.5/0.7 would yield the offset within a quarter track. Dividing the ratio (0.5/0.7) by 4, as is done in Eq. 1, would further normalize the offset value to within one whole track, i.e., yielding the PES. As can be appreciated from those skilled in the art, the combination of the reference half-track position (represented by the expression 0.5*n) and the PES (the expression ((R–F)/(4K)) represents the PES in this case) permits the servo circuitry to ascertain the position of the head from the relationship between the rising and falling servo bursts.

As the head moves from the left side of quarter track line 203 to the right of quarter track line 203, a different set of servo bursts is employed to determine the PES. This is because, as shown in FIG. 4, the differential signal B–D loses its sensitivity and becomes substantially less linear in the region between quarter track line 203 and center track line 204. In the region between quarter track lines 203 and 205, the amplitude of servo burst A is falling and the amplitude of servo burst C is rising, as can be seen in FIG. 3. Accordingly, the differential signal C–A will be employed to represent the value R–F in Eq. 1.

In this disclosure, it is sometimes more convenient and less confusing to employ the reflection of a signal for discussion purposes in the Figures. For example, it is convenient in FIG. 4 to refer to the reflection of curve C–A, which is curve A–C for discussing the servo control issues. Accordingly, points 412 and 414 are shown on respective falling curves B–D and A–C although Eq. 1 shows that they in fact reside on respective rising curves D–B and C–A.

Point 404 is referred to herein as the switch-over point, i.e., the point at which the calculation switches from one differential signal to another differential signal to substantially maintain linearity and sensitivity. As can be seen in FIG. 4, the switch-over point occurs when the magnitude of A–C equals the magnitude of B–D.

In the prior art, the normalization value K is a constant, which may be obtained by ascertaining, for example, the average value of a number or all switch-over points of adjacent tracks on the disk. With reference to FIG. 4, for example, if switch-over point 404 is measured at 0.7 V, switch-over point 406 is measured at 0.65V and switch-over point 408 is measured at 0.75V, the average value of 0.7 V may be employed as the value for K. Such a static K value, however, gives rise to servo discontinuity at the quarter track position.

Consider, for example, the situation wherein the head is at the vicinity of point 406 (i.e., around the quarter track line 205 of FIG. 2). Due to variations in manufacturing and environmental factors, the switch-over point (i.e., the point at which the magnitude of A–C equals the magnitude of B–D) is 0.65V, which is below the static value of 0.7V employed for K in the PES calculation. If the head is at point 410 on curve C–A (since the amplitude of C is rising and the amplitude of A is falling in this vicinity as shown in FIG. 3) and is servoed toward the quarter track position, i.e., to the right of FIG. 4, it will be servoed to the right of the x-axis until the value of 0.65V is read for the differential signal along curve C–A. At this point, the servo circuit believes that it has not yet reached the quarter track position (since the servo circuit employs a normalization factor based on a K value of 0.7V to calculate the PES). If n is arbitrarily assumed to be one for illustrative purposes, this track position is 0.5*1+(0.65/4*0.70) or 0.73, for example.

The servo circuit thus continues to move the head to the right in FIG. 4. As soon as the head moves to the right of line 205, however, the calculation switches from curve C–A to curve B–D (since the amplitude of B is rising and the amplitude of D is falling in this vicinity as shown in FIG. 3). The switch-over occurs since the magnitude of C–A equals the magnitude of B–D as the head moves to the right of line 205.

Since the value of B–D will be near 0.65 immediately after switching, the servo circuit will be under the mistaken impression that the head has overshot the quarter track position and needs to move to the left along the x-axis again. To continue with the earlier example, n is now 2, and this track position is 0.5*2–(0.65/4*0.70) or 0.77, for example. The value of B–D after switching is shown on the B–D curve of FIG. 4 as point 412. This impression is created by the fact that the normalization factor is based on a K value of 0.7V, which makes the value of (R–F)/K less than unity around the vicinity of the quarter track line. Consequently, the servo circuit may go on issuing servo commands which cause the head to hunt to the left and right of quarter track line 205 without ever actually settling on the quarter track line.

As can be appreciated in the prior art, this situation gives rise to servo instability around the quarter track position. Since the prior art technique of ascertaining the PES gives rise to discontinuity around the quarter track position, accurate positioning of the head at this quarter track point proves difficult.

In view of the foregoing, there are desired improved methods and apparatus for reducing the discontinuity around the quarter track position, which leads to servo stability when the head is servoed to the quarter track position.

SUMMARY OF THE INVENTION

The invention relates to methods and apparatus for ascertaining a position of a read/write head relative to a reference position on a rotatable disk in a computer disk drive. In one aspect of the present invention, a method for determining the position of a read/write head relative to a reference position on a rotatable disk in a computer disk drive includes reading amplitudes of a set of servo bursts embedded in tracks of the disk and classifying the servo bursts into a converging servo burst set and a detection servo burst set around the reference position. The method also includes forming a position error signal by augmenting a detection servo burst signal with a converging servo burst signal as well as a normalization factor. The converging servo burst signal is formed from amplitudes of the converging servo burst set at the position of the read/write head. The detection servo burst signal is formed from amplitudes of the detection servo burst set at the position of the read/write head. The position error signal represents an offset from the reference position.

In one embodiment, the set of servo bursts includes four servo bursts, and classifying the servo bursts involves assigning a high classification to a first servo burst, in addition to assigning a low classification to a second servo burst. Further, a rising classification is assigned to a third servo burst, while a falling classification is assigned to a fourth servo burst. In such an embodiment, a position error signal is formed by calculating a first difference between the rising amplitude and the falling amplitude, calculating a second difference between the highest amplitude and the lowest amplitude, and normalizing the second difference using said normalization factor. A first constant may be created using the normalization factor, and the normalized second difference may be subtracted from the first constant to obtain the augmentation factor. The augmentation factor may be multiplied by the first difference in order to form the position error signal.

In accordance with another aspect of the present invention, a method for forming a signal approximating a current position of a read/write head on a disk in a computer disk drive relative to a ½ track position of a given track of the disk includes reading amplitudes of a set of four contiguous servo bursts embedded in tracks of the disk. The tracks included on the disk include a track designated as the given track. The method also includes classifying the set of four contiguous servo bursts into a converging servo burst set and a detection servo burst set. The classifying is performed in a region between a ¼ track position and a ¾ track position of the given track. There is also included forming a position error signal by augmenting a detection servo burst signal using both a normalization factor and a converging servo burst signal. The converging servo burst signal is formed from amplitudes of the converging servo burst set. The detection servo burst signal is formed from amplitudes of the detection servo burst set. The position error signal represents an offset from the ½ track position of the given track.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which like reference numbers refer to like structures/items and in which.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with one aspect of the present invention, there are provided improved techniques for positioning the R/W head of a disk drive based on the servo burst amplitudes. The improved techniques advantageously employ the converging servo burst signal to normalize the detection servo burst signal in the calculation of the PES. By employing the converging servo burst signal to normalize, the value of the PES is assured to converge at the vicinity of the switch-over points to render the PES calculation continuous at the vicinity of the switch-over points. Since the PES calculation is continuous at the switch-over points, servo instability at the switch-over points is advantageously minimized.

Figure 4:
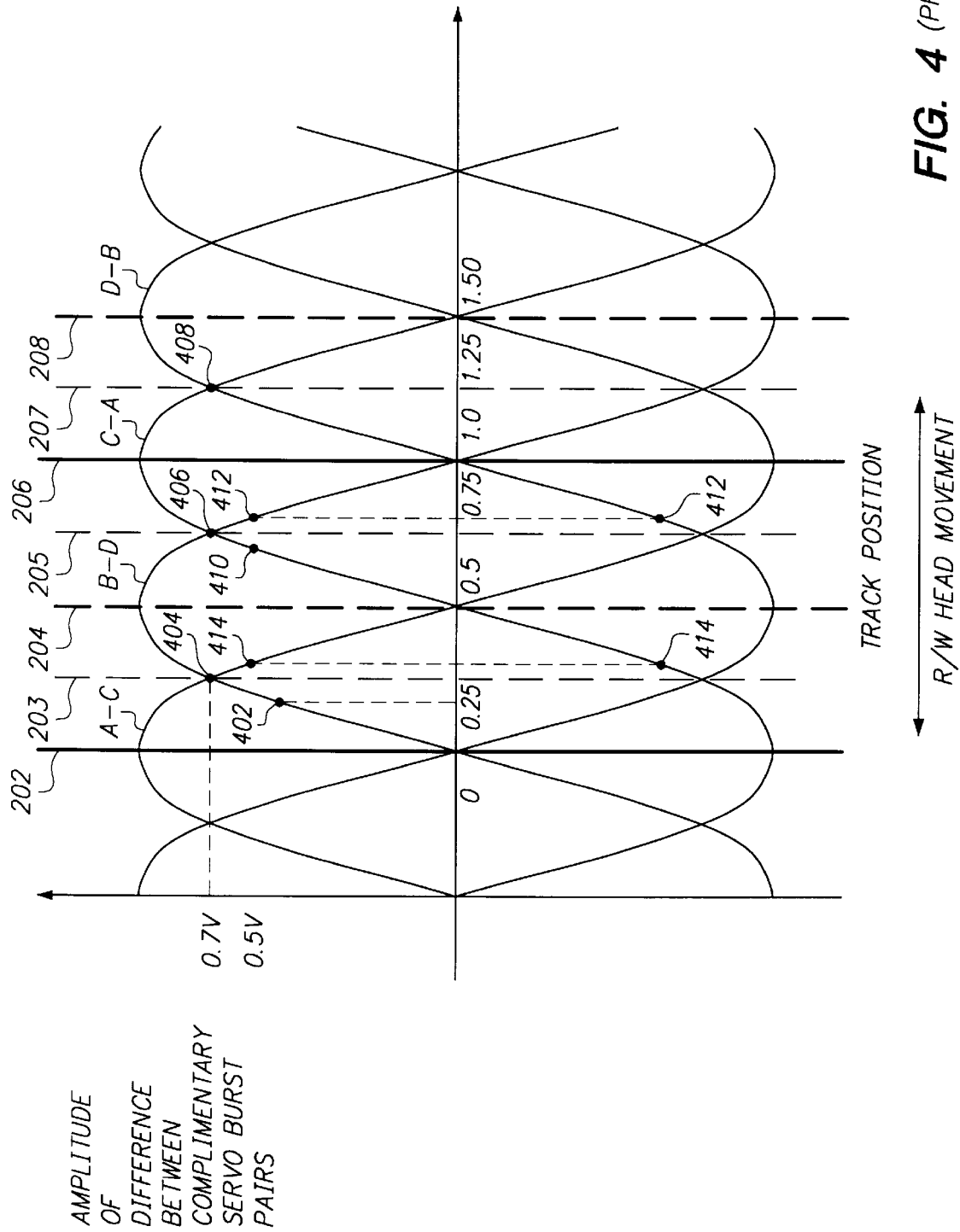
FIG. 4 illustrates the differential signals obtained from the servo burst signals of FIG. 3.

To facilitate understanding of the foregoing, reference may now be made to FIG. 4, which was previously described. In the following discussion, servo stability at about the quarter track position will be discussed in detail although, as will be appreciated by those skilled in the art given this disclosure, the techniques described herein also apply to switch-over points which are located around other track positions (e.g., at the ⅓ track positions if the servo bursts are arranged in sets of three).

The switch-over points (e.g., point 404) typically occur when the magnitude of the converging servo burst signal (e.g., signal A–C when the head is at point 402) equals the magnitude of the detection servo burst signal (e.g., signal B–D when the head is at point 402). Since the servo bursts are arranged in sets of four in the example of FIG. 4, the switch-over points roughly coincide with the quarter track positions. As the term is employed herein, the detection servo burst signal represents the servo burst signal by which the head position is estimated in a given track position regime. At any given location in a track, a unique detection servo burst signal is employed as the primary signal for translating some servo burst measurements into the PES. For example, when the head is located in the region of reference line 202+/−¼ track, the detection servo burst signal is B–D in FIG. 4 since this servo burst signal is more linear than the A–C signal (or its mirror signal C–A) and is therefore more suitable for estimating the PES. The converging servo burst signal in this example is signal B–D since it converges with the detection servo burst signal A–C at the switch-over point 404. Note that although the differential signals of FIG. 4 are employed in the PES calculation in this example, the use of differential signals is not an absolute requirement of the invention.

At the switch-over point represented by point 404, the value of converging servo burst signal A–C equals the value of detection servo burst signal B–D. In other words, the head is at the switch-over point when the ratio of (B–D)/(A–C) equals to unity. It is advantageously recognized that if this ratio is employed to calculate the PES, i.e., if the value of converging servo burst signal A–C is employed to normalize the value of detection servo burst signal B–D, convergence at the switch-over point is advantageously assured.

In contrast, prior art techniques typically employ only the detection servo burst signal in calculating the PES. To normalize, the prior art techniques employ either a constant K (as described in the background section herein) or variations of the detection servo burst signal. Because of this, convergence at the switch-over point is not certain in the prior art. By way of example, Eq. 1 shows that no servo burst signal other than the detection servo burst signal (i.e., R–F) is employed in the calculation of the PES. When the detection servo burst signal switches from one set of servo bursts to the next set of servo bursts, e.g., when the head moves across the switch-over point, a small change in the head position may be reflected by a disproportionate calculated position if there is any mismatch between the different sets of burst signals around the switch-over point. If a constant (e.g., K in Eq. 1 ) is employed to normalize the detection servo burst signal, it is entirely possible, as discussed in the example of the background section herein, that the ratio would not converge to a unity value in the vicinity of the quarter track point to assure servo stability.

Figure 1:
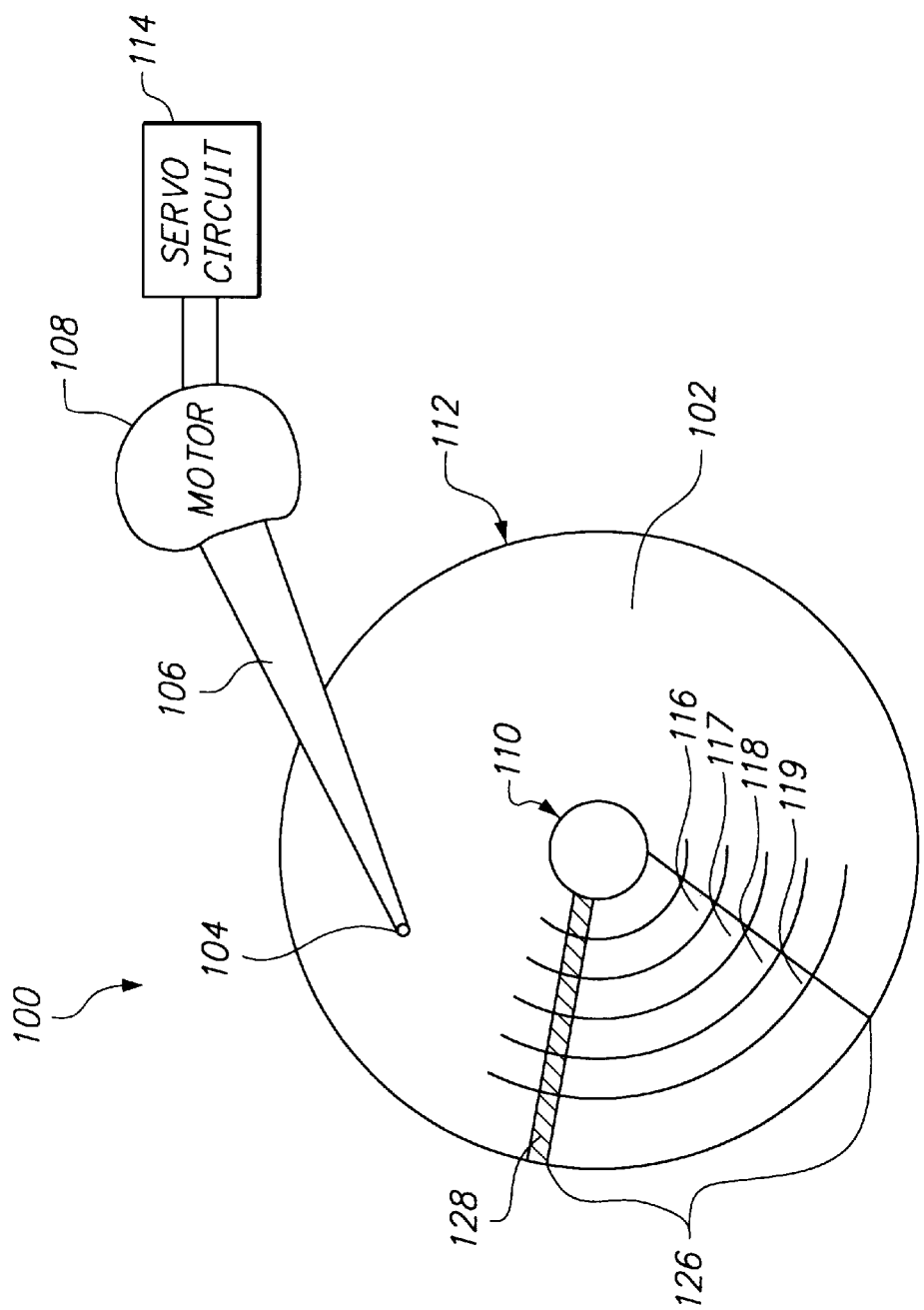
FIG. 1 illustrates a typical hard disk drive surface, including the data-storage sectors and servo wedges.
Figure 2:
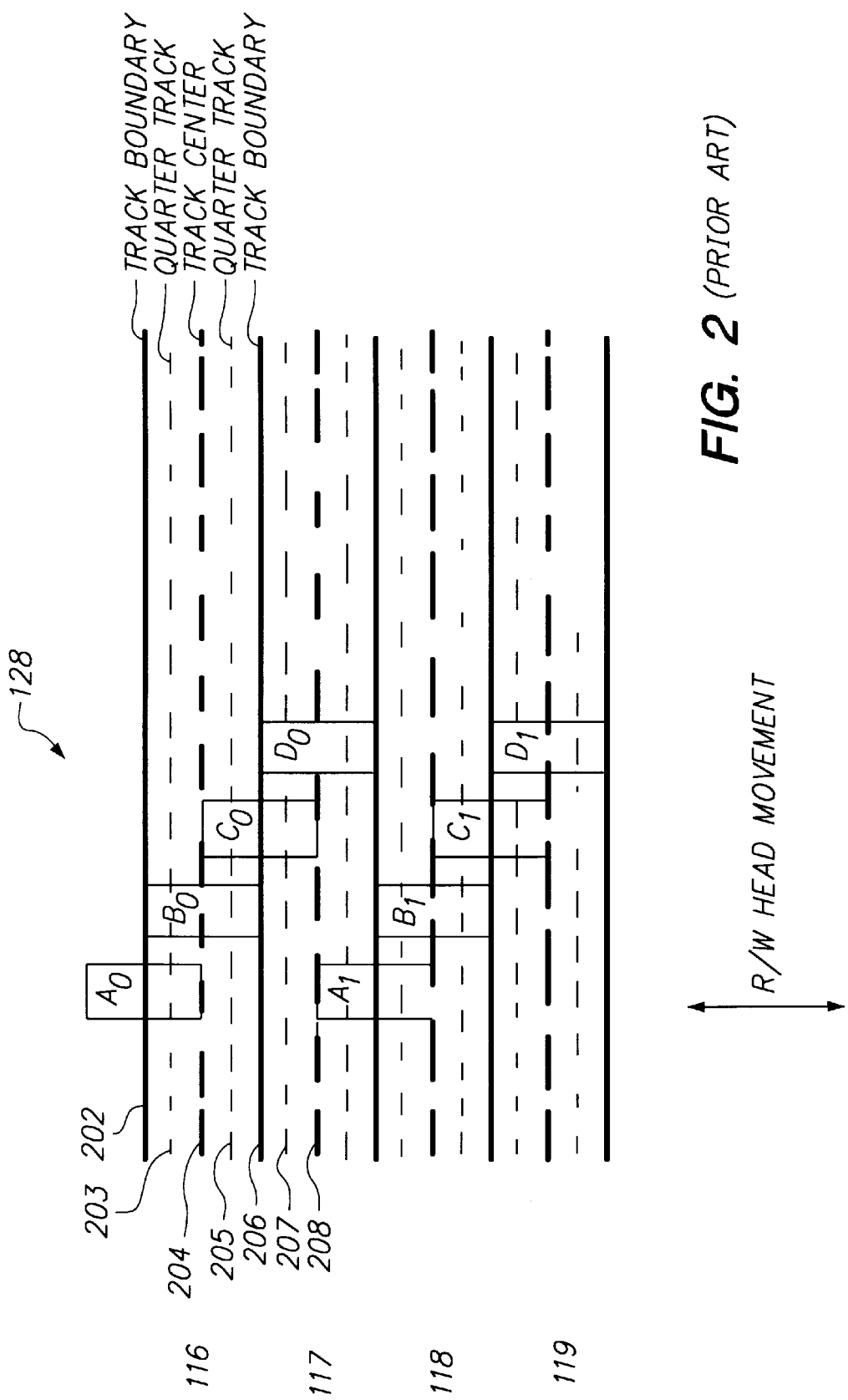
FIG. 2 illustrates typical servo burst marks in a servo wedge on a hard disk drive surface.

In the example of FIG. 4, the head position at any point in time may be represented by substantially any suitable relationship. In a first embodiment, the head position at any point in time may be expressed using the following equation, referred to herein as "Equation 2," or "Eq. 2":

$$0.5n + \frac{R - F}{4(H - L)}$$

wherein n represents an integer. The expression 0.5*n represents the reference line from which the head is offset. As mentioned earlier, this reference line may be either a track boundary or a track center line (as indicated by the value 0.5 in the expression 0.5*n). With reference to FIG. 2, the reference line may be, for example, either line 202, 204, 206, or 208 depending upon the value of n.

The expression ((R–F)/4(H–L)) represents the PES, i.e., the offset from the reference line, wherein R represents the amplitude of the rising servo burst, and F represents the amplitude of the falling servo burst. In this expression, R–F forms the detection servo burst signal. H represents the amplitude of the high servo burst, and L represents the amplitude of the low servo burst. In this expression, H–L forms the converging servo burst signal.

Figure 3:
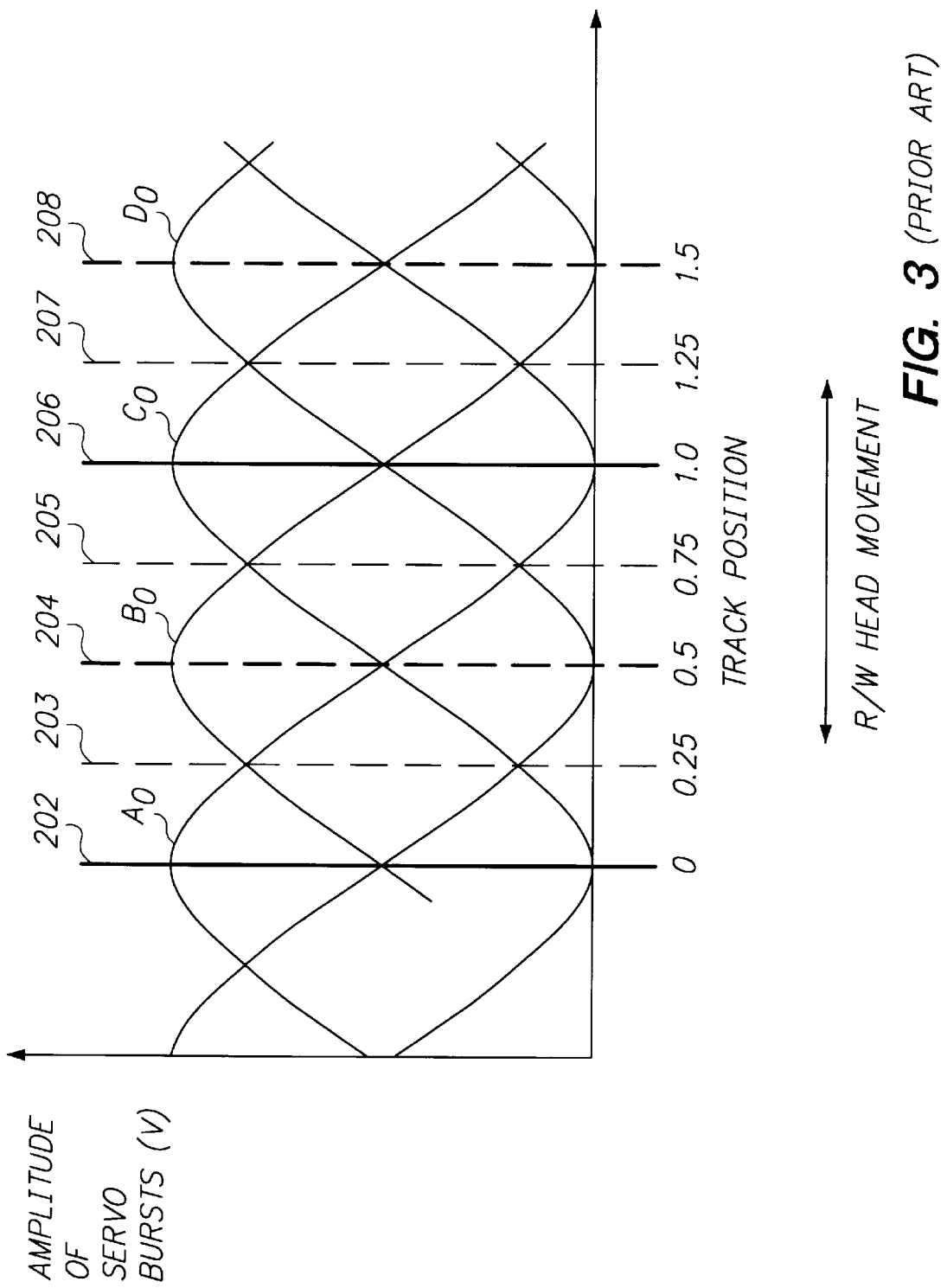
FIG. 3 illustrates servo burst signals obtained from the servo burst marks of FIG. 2 as the head moves downward in the Figure (i.e., in the cross track direction).

The determination of whether a servo burst is high, low, falling, or rising is made in a region delineated by the adjacent switch-over points. With reference to FIG. 4, for example, if the head is at point 402, the classification of H, L, R, or F for servo bursts A, B, C, and D is done within the region of reference line 202+/−¼ track. Reference to FIG. 3 shows that B is Rising, D is Falling, A is High, and C is Low in this region. Accordingly, the PES expression is ((B–D)/4(A–C)). Thus, whenever the head is located in the region of reference line 202+/−¼ track, the head position may be calculated by adding the PES to the reference line 202 (i.e., the head position is line 202+((B–D)/4(A–C))). This is consistent with FIG. 4 at point 402.

On the right hand side of the switch-over point 404, e.g., if the head moves to point 414 of FIG. 4, the classification of H, L, R, or F for servo bursts A, B, C, and D is done within the region of reference line 204+/−¼ track. Reference to FIG. 3 shows that C is Rising, A is Falling, B is High, and D is Low in this region. Accordingly, the PES expression is ((C–A)/4(B–D)). It should be apparent to those skilled in the art that this expression is algebraically equivalent to −((A–C)/4(B–D)). Thus, whenever the head is located in the region of reference line 204+/−¼ track, the head position may be found by adding the PES to the reference line 204 (i.e., the head position is line 204−((A–C)/4(B–D))). This again is consistent with FIG. 4 at point 414.

As can be seen in the previous example, if the head moves across a switch-over point, the offset is continuous across the switch-over point since the PES expression merely swaps the numerator and the denominator (and changes the algebraic sign). The use of a converging servo burst signal to normalize the detection servo burst measurements in the calculation of the PES advantageously ensures that the PES value converges to the switch-over point irrespective of whether there is any mismatch between different sets of servo burst measurements around the switch-over points. In this manner, the PES calculation is continuous around the switch-over point, i.e., roughly around the quarter track position in this example, to ensure servo stability.

To further illustrate, the PES expression when the head is slightly to the left of quarter track line 203 in FIG. 4 is ((B–D)/4(A–C)) as discussed in the example above. The PES expression when the head is slightly to the left of quarter track line 203 in FIG. 4 is −((A–C)/4(B–D)). Since both of these expressions evaluate to roughly +¼ and −¼ when the head is close to the switch-over point, there will be very little change in the calculated position of the head as the head is servoed a small distance across the switch-over point (since the head position at reference line 202+¼ track is roughly equal to the head position at reference line 204−¼ track). This fact ensures that the calculation of the head position is continuous across the switch-over point, e.g., roughly around the quarter track position in this example.

Note that the algebraic sign of the PES expression in Eq. 2 changes accordingly to ensure that when the head is to the left of quarter track line 203 in FIG. 4, a positive PES value is added to the appropriate reference line, e.g., reference line 202. When the head is to the right of quarter track line 203 in FIG. 4, a PES value is subtracted from the appropriate reference line, e.g., reference line 204.

While accurate, the expression used to express head position, i.e., Eq. 2, may at times be considered to be relatively slow, from a computational standpoint. In general, as will be appreciated by those skilled in the art, the division operation used in Eq. 2 is computationally slower than other operations, e.g., an addition operation or a multiplication operation. Hence, by approximating the fractional track position (R–F)/(4(H–L)) in Eq. 2 without the division operation, head position may be determined more efficiently. As will be appreciated by those skilled in the art, division operations involving a constant, as in Eq. 1, are commonly handled by precalculating the inverse of the constant and then, in real time, using that inverse as a multiplicative constant in the primary calculation in order to avoid the more time-consuming division.

In a second embodiment, the head position at any point in time may be expressed using the following equation, referred to herein as "Equation 3," or "Eq. 3":

$$0.5n + (R-F)(K_1 - (H-L)K_2)$$

wherein n represents an integer, $K_1$ represents $1/(2K)$, and $K_2$ represents $1/(2K)^2$. The value K in Eq. 3 represents the quarter track normalization value which effectively translates the measured value of R–F, as measured in volts, into an offset value. In other words, K is essentially equivalent to the value of R–F at switch-over points.

The fractional track position in Eq. 3 is given by:

$$(R-F)(K_1 - (H-L)K_2)$$

The fractional track position does not include a division operation involving the quantity (H–L). As such, the calculation of the fractional track position included in Eq. 3 may be computationally faster than the calculation of the fractional track position included in Eq. 2. The ability to effectively eliminate the division operation involving the quantity (H–L) is a result of the characteristic that the expression (R–F)/(H–L) converges to the value "1" at the switch-over point, and the characteristic that the values of (R–F) and (H–L) at that switch-over point, e.g., where those two values are equal, may be approximated by a constant.

As a value "v" approaches unity, the inverse of the value "v," namely "1/v" also approaches unity. Further, the inverse "1/v" approaches (2−v) even more rapidly. In one embodiment, the expression ((R–F)/(H–L)) may be separated into two parts, such that each part is close to unity. For example, the expression ((R–F)/(H–L)) may be expressed as:

$$\frac{(R-F)}{K} * \frac{K}{(H-L)}$$

where K is an approximation of the value of (R–F) and (H–L) at the switch-over point. The term (K/(H–L)), which involves real-time division, may be approximated by the expression (2−(H–L)/K), which involves a subtraction and a multiplication by a pre-calculated constant.

While Eq. 3 represents an approximation to the "ideal" expression of Eq. 2, the error associated with the approximation in Eq. 3 is insignificant relative to the error associated with the conventional expression of Eq. 1. By way of example, if the approximation of K is in error by approximately five percent at a particular switch-over point, the expression (R–F)/4K from Eq. 1 will generally exhibit a discontinuity of approximately ten percent. On the other hand, the expression $(R-F)(K_1 - (H-L)K_2)$ from Eq. 3 will generally exhibit a discontinuity of approximately half of a percent.

As previously described, the first embodiment of the present invention as expressed by Eq. 2, eliminates errors associated with the difference between a constant, which is based on a value of (R–F) at a switch-over point, and the true value of (R–F) at the switch-over point. The second embodiment of the present invention, which is expressed by Eq. 3, is an approximation of Eq. 2 and, hence, reduces discontinuities associated with Eq. 1, while effectively avoiding the potentially larger computation time associated with the real-time divide operation in Eq. 2.

Figure 5:
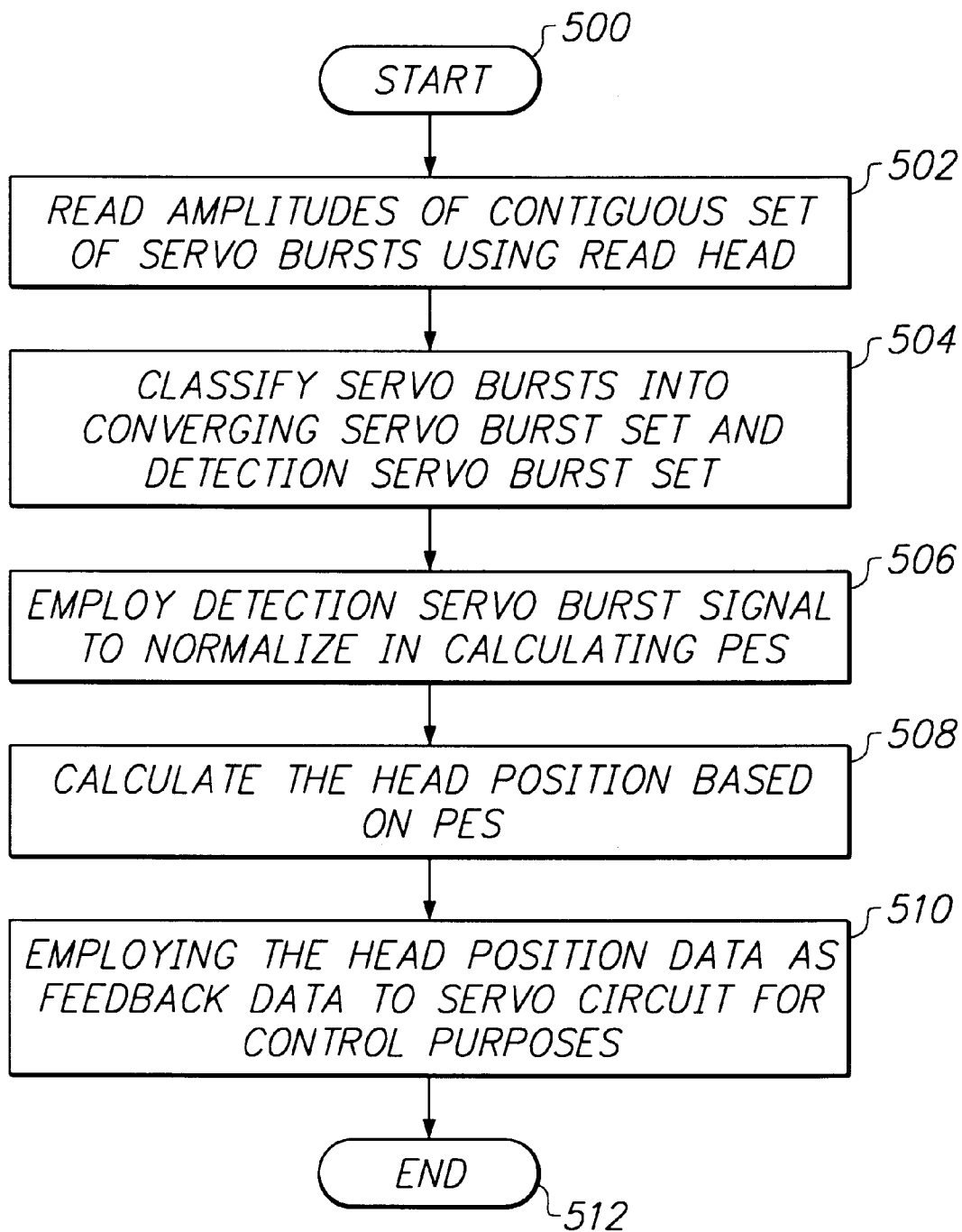
FIG. 5 is a flow chart illustrating, in accordance with one embodiment of the present invention, an improved technique for calculating the position of the R/W head, which minimizes discontinuity and servo instability.

FIG. 5 illustrates, in accordance with an embodiment of the present invention, the steps involved in calculating the position of the R/W head. In step 502, the amplitudes of the contiguous set of servo bursts are ascertained, e.g., using the read head.

The servo bursts are then classified into a detection servo burst set and a converging servo burst set in step 504. In the example of FIG. 4, the detection servo burst set comprises the Rising and Falling servo bursts. The converging servo burst set comprises the High and Low servo bursts. As mentioned previously, the classification is performed within the region surrounding the reference line extending to the switch-over points on either side of the reference line. When the servo bursts are in a quadrature arrangement, the reference line is represented by the expression 0.5*n where n is an integer, and the switch-over points on either side of the reference line occur at +/–¼ track. Implicit in this technique is the fact that the classification changes as the head crosses a switch-over point. In the example of FIGS. 2, 3, and 4, the classification changes as the head crosses the vicinity of a quarter track line, e.g., across line 203, 205, or 207 of FIGS. 2, 3, and 4.

In step 506, the converging servo burst signal is employed to normalize the detection servo burst signal in the calculation of the PES. As Eq. 2 shows, the PES value when the servo bursts are in a quadrature arrangement may be calculated, in one embodiment, by the expression ((R–F)/4(H–L)). In another embodiment, the PES value may be calculated using the expression ((R–F)($K_1$–(H–L)$K_2$)).

In step 508, the PES is employed to calculate the current position of the head. As mentioned earlier, the current position of the head may be calculated by either the expression of Eq. 2, i.e., 0.5*n+((R–F)/4(H–L)), or the expression of Eq. 3, i.e., 0.5*n+((R–F)($K_1$–(H–L)$K_2$)).

In step 510, the calculated position of the head is sent to the servo circuit as a feedback signal. Using this feedback signal, the servo circuit may then generate servo signals to move the head to a desired location in the track.

As can be appreciated from the foregoing, the use of the converging servo burst signal as a normalization factor in the calculation of the PES advantageously ensures that the PES value converge to the switch-over point irrespective whether there is any nonuniformity in the adjacent servo bursts (e.g., sets A/C and B/D) around the vicinity of the switch-over point.

The use of the converging servo bursts to normalize is nonobvious since it runs counter to the desire to simplify calculation in the derivation of the PES. With the present invention, although additional calculations are required in the calculation of the PES (relative to the prior art technique which uses a constant to normalize), the inventive technique nevertheless offers servo stability at the quarter track points in a manner that may be difficult to achieve in the prior art.

The inventive technique is also nonobvious since the use of the converging servo burst signal (e.g., H–L) to normalize makes the PES calculation less linear than the prior art technique (since the normalization factor changes with the head position). For this reason, such use is counterintuitive. Nevertheless, the nonlinearity may be addressed through the use of an appropriate characterizing function by the servo circuit, or by other well known techniques for handling such nonlinearity in the expression. Although this may require additional computations, it is believed that any disadvantage that the additional computations may impose may be outweighed by the substantial elimination of discontinuity in the PES calculation around the switch-over point and the improvement in servo stability. This is particularly true when modem digital circuitry, which tends to have a fairly large computational bandwidth, is employed in performing the calculation of the head position.

It should be noted that although the present invention has been described in detail with reference to servo bursts which occur in sets of four and which form switch-over points at about the quarter track position, the inventive techniques described herein also apply when the servo bursts are arranged in other ways. For example, if the servo bursts are arranged in sets of three (thereby forming switch-over points at ⅓ track and ⅔ track), a suitable converging servo burst signal may be employed to normalize the detection servo burst measurements to ensure that the PES evaluation is continuous at the switch-over point as the head moves across the switch-over point. The adaptation of the disclosed techniques to other servo burst arrangements and other switch-over locations in the tracks is well within the skills of those skilled in the art given this disclosure.

While this invention has been described in terms of several preferred embodiments, there are alterations, permutations, and equivalents which fall within the scope of this invention. It should also be noted that there are many alternative ways of implementing the methods and apparatuses of the present invention. By way of example, methods and expressions used to approximate a fractional track position and, hence, head position, may be widely varied without departing from the spirit or the scope of the present invention. It is therefore intended that the following appended claims be interpreted as including all such alterations, permutations, and equivalents as fall within the true spirit and scope of the present invention.

What is claimed is:

1. A method for ascertaining a position of a read/write head relative to a reference position on a rotatable disk in a computer disk drive, comprising:

reading amplitudes of a set of servo bursts embedded in tracks of said disk;

classifying said servo bursts into a converging servo burst set and a detection servo burst set around said reference position; and forming a position error signal by augmenting a detection servo burst signal with an augmentation factor, wherein said augmentation factor includes a normalization factor and a converging servo burst signal, said converging servo burst signal being formed from a highest amplitude and a lowest amplitude of said converging servo burst set at said position of said read/write head, said detection servo burst signal being formed from a rising amplitude and a falling amplitude of said detection servo burst set at said position of said read/write head, said position error signal representing an offset from said reference position.

2. The method of claim 1 further comprising:

forming a head position signal representative of said position of said read/write head from said position error signal.

3. The method of claim 2 further comprising employing said position error signal as a feed back signal to servo said read/write head to a desired position on said disk.

4. The method of claim 1 further comprising employing said position error signal as a feedback signal to servo said read/write head to a desired position on said disk.

5. The method of claim 1 wherein said read/write head represents magneto-resistive (M/R) heads.

6. A method for ascertaining a position of a read/write head relative to a reference position on a rotatable disk in a computer disk drive, comprising:

reading amplitudes of a set of servo bursts embedded in tracks of said disk;

classifying said servo bursts into a converging servo burst set and a detection servo burst set around said reference position, wherein said set of servo bursts comprises four servo bursts, said classifying comprises:

assigning a high classification to a first one of said set of servo bursts, said first one of said set of servo bursts yielding a highest amplitude of said amplitudes, a low classification to a second one of said set of servo bursts, said second one of said set of servo bursts yielding a lowest amplitude of said amplitudes, wherein said first one of said set of servo bursts and said second one of said set of said servo bursts form said converging servo burst set; and assigning a rising classification to a third one of said set of servo bursts, said third one of said set of servo bursts yielding a rising amplitude of said amplitudes, and a falling classification to a fourth one of said set of servo bursts, said fourth one of said set of servo bursts yielding a falling amplitude of said amplitudes, wherein said third one of said set of servo bursts and said fourth one of said set of said servo bursts form said detection servo burst set; and forming a position error signal by augmenting a detection servo burst signal with an augmentation factor, wherein said augmentation factor includes a normalization factor and a converging servo burst signal, said converging servo burst signal being formed from amplitudes of said converging servo burst set at said position of said read/write head, said detection servo burst signal being formed from amplitudes of said detection servo burst set at said position of said read/write head, said position error signal representing an offset from said reference position.

7. The method of claim 6 wherein said forming comprises:

calculating a first difference between said rising amplitude and said falling amplitude;

calculating a second difference between said highest amplitude and said lowest amplitude; and normalizing said second difference using said normalization factor.

8. The method of claim 7 wherein said forming further comprises:

creating a first constant using said normalization factor; and subtracting said normalized second difference from said first constant to obtain said augmentation factor.

9. The method of claim 8 wherein said creating said first constant further includes:

inverting said normalization factor; and multiplying said inverted normalization constant by 2.

10. The method of claim 8 further including:

multiplying said augmentation factor by said first difference to form said position error signal.

11. A method for forming a signal approximating a current position of a read/write head on a disk in a computer disk drive relative to a ½ track position of a given track of said disk, said method comprising:

reading amplitudes of a set of four contiguous servo bursts embedded in tracks of said disk, said tracks including said given track;

classifying said set of four contiguous servo bursts into a converging servo burst set and a detection servo burst set, said classifying being performed in a region between a ¼ track position and a ¾ track position of said given track;

forming a position error signal by augmenting a detection servo burst signal with an augmentation factor, said augmentation factor including a normalization factor and a converging servo burst signal, said converging servo burst signal being formed from a highest amplitude and a lowest amplitude of said converging servo burst set, said detection servo burst signal being formed from a rising amplitude and a falling amplitude of said detection servo burst set, said position error signal representing an offset from said ½ track position of said given track.

12. The method of claim 11 wherein said read/write head represents magneto-resistive (M/R) heads.

13. The method of claim 11 further comprising employing said position error signal as a feed back signal to servo said read/write head to a desired position on said disk.

14. A method for forming a signal approximating a current position of a read/write head on a disk in a computer disk drive relative to a ½ track position of a given track of said disk, said method comprising:

reading amplitudes of a set of four contiguous servo bursts embedded in tracks of said disk, said tracks including said given track;

classifying said set of four contiguous servo bursts into a converging servo burst set and a detection servo burst set, said classifying being performed in a region between a ¼ track position and a ¾ track position of said given track, and said classifying comprises:

assigning a high classification to a first one of said set of servo bursts, said first one of said set of servo bursts yielding a highest amplitude of said amplitudes within said region, a low classification to a second one of said set of servo bursts, said second one of said set of servo bursts yielding a lowest amplitude of said amplitudes within said region, wherein said first one of said set of servo bursts and said second one of said set of said servo bursts form said converging servo burst set; and assigning a rising classification to a third one of said set of servo bursts, said third one of said set of servo bursts yielding a rising amplitude of said amplitudes within said region, and a falling classification to a fourth one of said set of servo bursts, said fourth one of said set of servo bursts yielding a falling amplitude of said amplitudes within said region, wherein said third one of said set of servo bursts and said fourth one of said set of said servo bursts form said detection servo burst set; and forming a position error signal by augmenting a detection servo burst signal with an augmentation factor, said augmentation factor including a normalization factor and a converging servo burst signal, said converging servo burst signal being formed from amplitudes of said converging servo burst set, said detection servo burst signal being formed from amplitudes of said detection servo burst set, said position error signal representing an offset from said ½ track position of said given track.

15. The method of claim 14 wherein said detection servo burst signal represents a difference between said rising amplitude and said falling amplitude, said converging servo burst signal representing a difference between said highest amplitude and said lowest amplitude.

16. The method of claim 15 wherein said augmenting represents:
   normalizing said converging servo burst signal using said normalization factor;
   creating a first constant using said normalization factor;
   determining a difference between said first constant and said normalized converging servo burst signal; and
   multiplying said difference with said detection servo burst signal.

17. In a computer disk drive, a method for ascertaining a position error signal representative of a distance between a current position of a read/write head on a surface of said disk drive and a reference track position on said surface, comprising:
   reading amplitudes of servo bursts A/B/C/D, said servo bursts A/B/C/D representing contiguous servo bursts that are embedded in a vicinity of said reference track position;
   classifying one of an A/C set and a B/D set into a converging servo burst set and another one of said A/C set and said B/D set into a detection servo burst set; and
   forming said position error signal by augmenting a detection servo burst signal with an augmentation factor, wherein said augmentation factor includes a normalization factor and a converging servo burst signal, said converging servo burst signal being formed from a highest amplitude and a lowest amplitude of servo bursts in said converging servo burst set, said detection servo burst signal being formed from amplitudes of servo bursts in said detection servo burst set.

18. The method of claim 17 further comprising employing said position error signal as a feed back signal to a servo circuit of said computer disk drive to servo said read/write head to a desired position on said disk.

19. In a computer disk drive, a method for ascertaining a position error signal representative of a distance between a current position of a read/write head on a surface of said disk drive and a reference track position on said surface, comprising:
   reading amplitudes of servo bursts A/B/C/D, said servo bursts A/B/C/D representing contiguous servo bursts that are embedded in a vicinity of said reference track position;
   classifying one of an A/C set and a B/D set into a converging servo burst set and another one of said A/C set and said B/D set into a detection servo burst set, said classifying comprising:
      assigning a high classification to a first servo burst of said servo bursts A/B/C/D, said first servo burst yielding a highest amplitude of said amplitudes within a region bounded by said reference track position+¼ track and said reference track position −¼ track, a low classification to a second servo burst of said set of servo bursts A/B/C/D, said second servo burst yielding a lowest amplitude of said amplitudes within said region, wherein said first servo burst and said second servo burst form said converging servo burst set; and
      assigning a rising classification to a third servo burst of said set of servo bursts A/B/C/D, said third servo burst yielding a rising amplitude of said amplitudes within said region, and a falling classification to a fourth servo burst of said set of servo bursts A/B/C/D, said fourth servo burst yielding a falling amplitude of said amplitudes within said region, wherein said third servo burst and said fourth servo burst form said detection servo burst set; and
   forming said position error signal by augmenting a detection servo burst signal with an augmentation factor, wherein said augmentation factor includes a normalization factor and a converging servo burst signal, said converging servo burst signal being formed from amplitudes of servo bursts in said converging servo burst set said detection servo burst signal being formed from amplitudes of servo bursts in said detection servo burst set.

20. The method of claim 19 wherein said detection servo burst signal represents a difference between said rising amplitude and said falling amplitude, said converging servo burst signal representing a difference between said highest amplitude and said lowest amplitude.

21. The method of claim 20 wherein said read/write head represents magneto-resistive (M/R) heads.

22. A computer readable medium containing instructions for ascertaining a position of a read/write head relative to a reference position on a rotatable disk in a computer disk drive, said instructions include:
   instructions for reading amplitudes of a set of servo bursts embedded in tracks of said disk;
   instructions for classifying said servo bursts into a converging servo burst set and a detection servo burst set around said reference position; and
   instructions for forming a position error signal by augmenting a detection servo burst signal with an augmentation factor, wherein said augmentation factor includes a normalization factor and a converging servo burst signal, said converging servo burst signal being formed from a highest amplitude and a lowest amplitude of said converging servo burst set at said position of said read/write head, said detection servo burst signal being formed from a rising amplitude and a falling amplitude of said detection servo burst set at said position of said read/write head, said position error signal representing an offset from said reference position.

* * * * *